June 16, 1959 H. H. PAYZANT ET AL 2,890,677
FINGER JOINT GLUER
Filed Oct. 15, 1957 4 Sheets-Sheet 1

INVENTOR.
HENRY H. PAYZANT
WILLARD B. LEFFLER
BY
BUCKHORN CHEATHAM & BLORE

ATTORNEYS

June 16, 1959

H. H. PAYZANT ET AL 2,890,677

FINGER JOINT GLUER

Filed Oct. 15, 1957

INVENTOR.
HENRY H. PAYZANT
WILLARD B. LEFFLER
BY
BUCKHORN, CHEATHAM & BLORE

ATTORNEYS

June 16, 1959     H. H. PAYZANT ET AL     2,890,677
FINGER JOINT GLUER
Filed Oct. 15, 1957     4 Sheets-Sheet 3
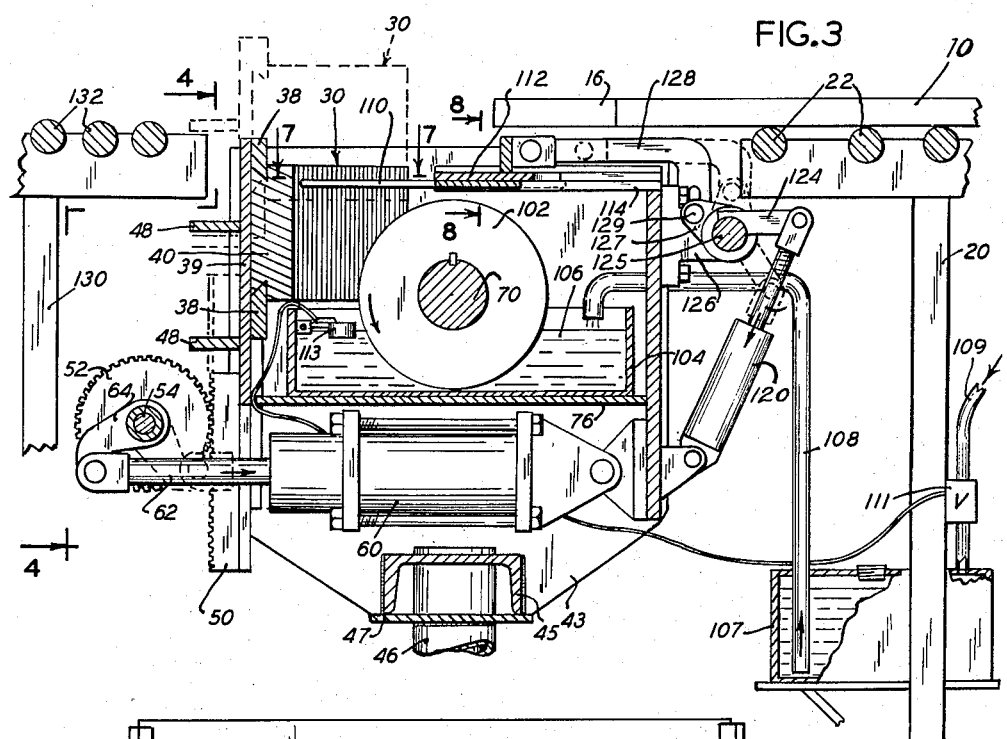
INVENTORS
HENRY H. PAYZANT
WILLARD B. LEFFLER
BY
BUCKHORN, CHEATHAM & BLORE
ATTORNEYS

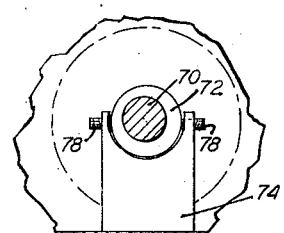
FIG.5
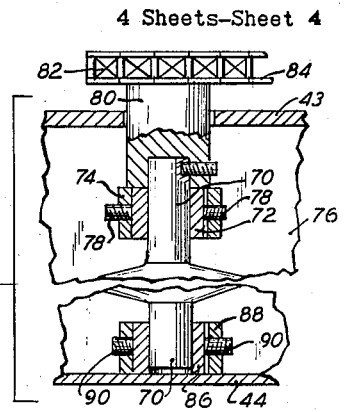
FIG.6
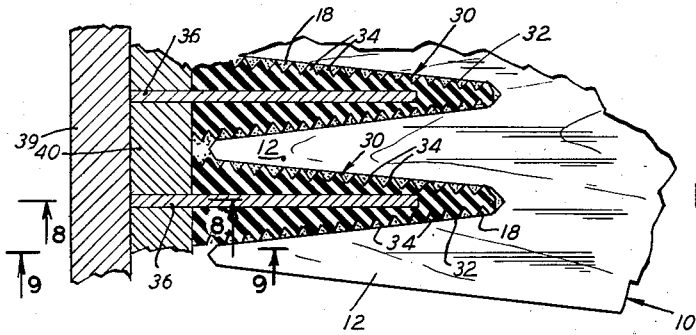
FIG.7
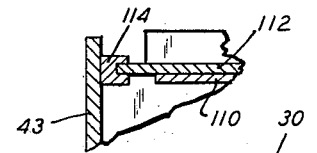
FIG.10
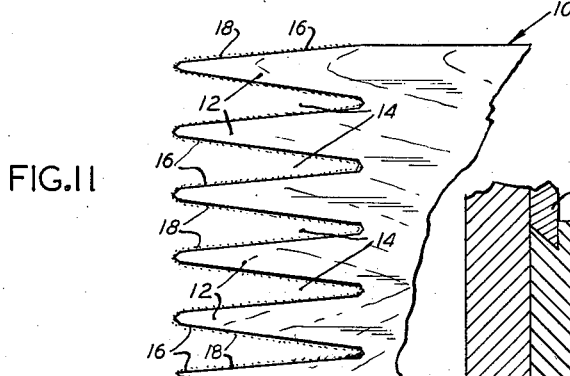
FIG.11
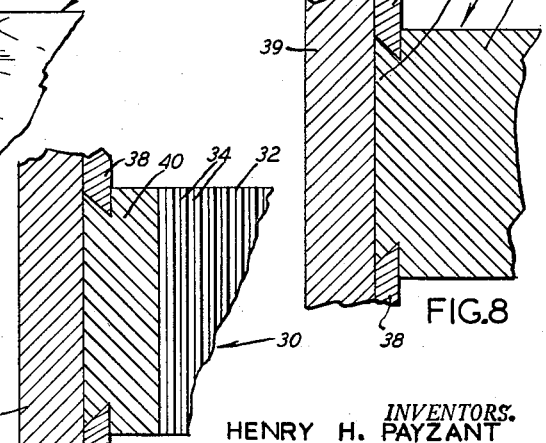
FIG.8
FIG.9
INVENTORS.
HENRY H. PAYZANT
WILLARD B. LEFFLER
BY
BUCKHORN, CHEATHAM & BLORE
ATTORNEYS

United States Patent Office

2,890,677
Patented June 16, 1959

2,890,677
FINGER JOINT GLUER

Henry H. Payzant and Willard B. Leffler, Portland, Oreg., assignors to Timber Structures, Inc., Portland, Oreg.

Application October 15, 1957, Serial No. 690,248

4 Claims. (Cl. 118—243)

The present invention relates to glue or adhesive spreading apparatus, and more particularly to apparatus for applying liquid adhesive to the joining surfaces on the ends of pieces of lumber formed for finger jointing with other similarly shaped lumber pieces.

In many instances it is desirable to join pieces of lumber or boards by gluing them end to end. A so-called finger joint, wherein the boards are formed with generally triangular meshing fingers, has many structural advantages and is a desirable form of joint. However, the use of finger joints in the mass production of end-to-end jointed pieces has heretofore been limited for certain reasons including the difficulty of economically securing an even coating of a glue or adhesive to the joining surfaces of the boards to be secured together. Also, mechanical apparatus devised heretofore for applying adhesive to the joining surfaces of finger-jointed boards did not effectively restrict the application of the adhesive to the joining surfaces, but frequently caused adhesive to be spread upon one or both of the opposite faces of the boards, which is not desirable for many reasons.

It is, then, an object of the present invention to provide apparatus for economically applying adhesive to the joining surfaces of a board formed for a finger joint.

More particularly, it is an object of the present invention to provide apparatus for applying a uniform coating of adhesive in the desired quantity to the joining surfaces of a finger-jointed board and without causing any spread of adhesive onto the opposite faces of the board.

Still other objects and advantages of the invention will become more apparent hereinafter.

In accordance with the illustrated embodiment, the apparatus of the present invention includes means for supporting the board to which adhesive is to be applied with the faces of the board extending horizontally and with the surfaces upon which the adhesive is to be applied extending vertically. The apparatus is provided with a number of resilient adhesive applying fingers shaped cooperatively to fit and engage the board finger surfaces. The adhesive applying fingers are mounted for reciprocation in a vertical direction between an upper position, wherein the adhesive applying fingers and the board fingers may be brought into mating contact to cause the adhesive from the adhesive applying fingers to be wiped onto the joining surfaces of the board fingers, and a lower position wherein additional adhesive is applied to the surfaces thereof by unique means described in greater detail hereinafter. Means are also provided to vibrate the fingers in a horizontal direction to assure contact of the fingers with the board finger surfaces.

For a more detailed description of the invention, reference is made to the accompanying drawings taken in conjunction with the following specification;

In the drawings,

Fig. 3 is a sectional view taken substantially along line 3—3 of Fig. 2;

Fig. 4 is an end view looking in the direction of the arrows 4—4 of Fig. 3;

Fig. 5 is a sectional view taken substantially along line 5—5 of Fig. 2 showing details of the mounting structure of a portion of the apparatus;

Fig. 6 is a fragmentary sectional view taken substantially along line 6—6 of Fig. 1;

Fig. 7 is a fragmentary view partly in section showing the engagement of the glue applying fingers of the apparatus of the invention with the fingers of a board end;

Fig. 8 is a fragmentary sectional view taken along line 8—8 of Fig. 7;

Fig. 9 is a fragmentary sectional view taken along line 9—9 of Fig. 7;

Fig. 10 is a fragmentary sectional view taken along line 10—10 of Fig. 3 showing further details of the apparatus of the invention;

Fig. 11 is a plan view of a board end formed for a finger joint with the similarly shaped board;

Fig. 13 is a sectional view taken along line 13—13 of Fig. 4.

Figure 1:
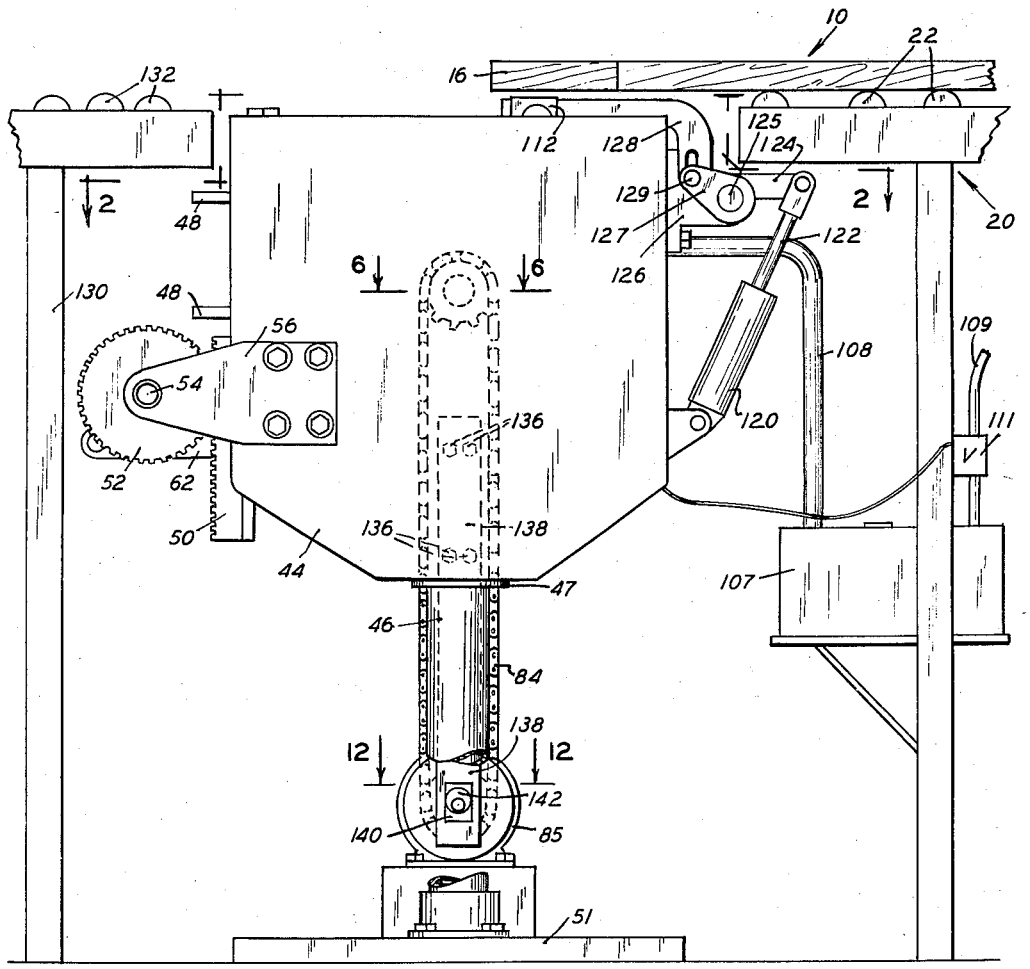
Fig. 1 is a fragmentary side elevation of apparatus incorporating the invention.

Referring to Fig. 11 there is there illustrated a fragmentary portion of a board 10 formed at one end for a finger joint comprising a plurality of alternate fingers 12 and finger receiving notches or slots 14 which in general outline are triangular, with the fingers diminishing from a wide base to a narrow tip and with the slots 14 converging from a wide mouth to an apex. Preferably, the fingers 12 and slots 14 are formed with blunted ends as illustrated and the slots and fingers are defined by walls or surfaces 16 which extend perpendicularly to the opposite faces of the board 10. It is upon the surfaces 16 it is desired to apply a layer of glue or adhesive as indicated at 18.

Means are provided in the apparatus of the invention for supporting a board 10 to which adhesive is to be applied with the board in a horizontal position and with the faces 16 of the board end extending vertically, such means in the illustrated embodiment consisting of a table 20 having a bed defined by rollers indicated at 22. Means are provided for applying the layer of glue or adhesive 18 to the joining surfaces 16 of the board 10 while it is supported on the table 20. The illustrated means comprise a plurality of fingers 30 shaped cooperatively to fit into the slots 14 of the board end. Each of the fingers 30 comprises a stiff but resilient outer portion 32 formed of rubber or other suitable material which in horizontal cross section is generally triangular and complementary to the shape of the board slots 14 as best indicated in Fig. 7. The blocks 32 are elongate in the vertical direction as they are mounted on the apparatus of the invention, (see Fig. 3) and are preferably formed on their outer surface with a plurality of vertical ribs 34 defining grooves in which adhesive may be carried.

Figure 2:
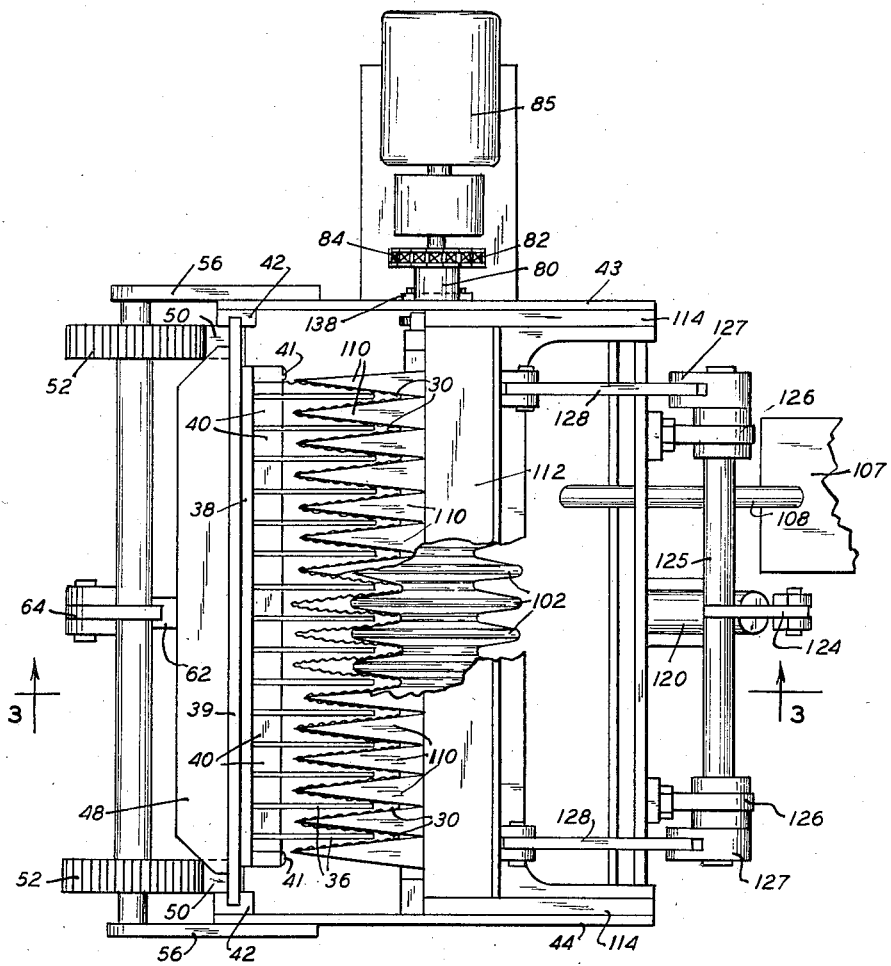
Fig. 2 is a top plan view of the apparatus of the invention.

Means are provided for supporting a plurality of such fingers in side-by-side relation for vertical movement between an upper position opposite a board 10 positioned on the table 20 and a lower position beneath the plane of the board. Referring particularly to Figs. 2 and 7, the blocks 32 are each formed with a vertically extending centrally disposed recess in which is received a mounting plate 36 and to which the block is secured as by gluing, bonding or otherwise. The mounting plates 36 are formed at their base ends with a dove tail tenon 37 for engaging within a mortise formed by vertically spaced elements 38 secured to a platelike cross member 39 which extends transversely of the machine. The mounting plates 36, and consequently the fingers 30, are maintained in spaced, vertically parallel relation by means of spacer blocks 40 also formed with a tenon to engage between the elements 38. The end most spacer blocks 40 may be secured against lateral movement by setscrews 41 or other suitable means. As will be apparent, the fingers 30 may be removed for repair or replacement simply by loosening a setscrew 41 and sliding the spacer blocks 40 and fingers endwise from between the elements 38 and thereafter remounting them in reverse manner.

The cross member 39 is supported for vertical reciprocation within guideways 42 suitably secured to the opposite side plates 43, 44 of the machine and which latter plates are welded or otherwise suitably secured adjacent their bottom edges to the opposite ends of a transversely extending channel member 45 supported upon a centrally disposed standard 46 mounted upon a base 51. The channel member 45 rests upon a bearing plate 47 fixedly secured to the standard 46 and which extends upwardly through an opening 49 in the web of the channel member so that the latter may pivot slightly about the standard for a purpose to be explained hereinafter. Bracing members 48 may be secured to the cross member 39.

Means are provided to reciprocate the cross member 39 and with it the fingers 30, such means in the present invention comprising a pair of racks 50 extending vertically along each of the opposite side edges of the cross member 39 as best seen in Fig. 4. Engaging the racks 50 are pinions 52 mounted on a shaft 54 journaled at its opposite ends in supporting members 56 bolted or otherwise suitably secured to the side plates 43, 44. In the illustrated embodiment of the invention rotation is imparted to the shaft 54 by means of a hydraulic motor including a cylinder 60 suitably mounted on the frame of the machine and a piston 62 secured to one end of a crank 64 fixed to the shaft 54. Referring to Fig. 3, operation of the motor 60, 62 actuates the pinions 52 and rachets 50 to move the glue finger assembly between the position shown in the solid lines and that shown in dotted lines and in which latter position, it will be noted the top portion of each of the glue applying fingers 30 is opposite the board 10.

Means are provided for applying liquid adhesive to the adhesive applying surfaces of the fingers 30 when the fingers are in their lowered position. Extending transversely of the machine just forward of the forward ends of the fingers 30 and adjacent the lower ends of the fingers in their lowered position is a shaft 70 journaled in the side plates 43, 44 by suitable means such as that illustrated in Figs. 5 and 6 of the application. Referring to Fig. 5, the end of the shaft 70 adjacent the side plate 43 is received within an eccentric bearing 72 supported in a saddle member 74 which extends upwardly from a base plate 76 secured to and extending between side plates 43, 44. Setscrews 78 are provided in the saddle 74 so that the position of the bearing may be adjusted as desired. Secured to the end of the shaft 70 adjacent the plate 43 is the stub shaft 80 of a sprocket 82 over which is trained a drive chain 84 driven by a motor 85. The opposite end of the shaft 70 is likewise received within an eccentric bearing 86 mounted within a saddle member 88 suitably secured to the side panel 44, setscrews 90 being provided to permit adjustment of the position of the bearing 86 in the saddle.

Mounted on the shaft 70 for rotation therewith are a plurality of radially tapered discs 102 adapted to extend at least partially in between the fingers 30 and wipe against the same when the latter are in their lower position and as shown in Fig. 3. Supported beneath the discs 102 on the bed plate 76 is a trough 104 in which a supply of liquid adhesive 106 is maintained at a level such that the lower portion of the discs 102 will be immersed in the adhesive. The adhesive 106 is fed to the trough 104 through a pipe 108 from a sealed pressure reservoir 107 connected to a source of air pressure by a line 109 having a control valve 111 therein. The valve 111 is controlled by a float switch 113 mounted in the trough 104 and which switch actuates the valve 111 when the level of adhesive drops below a predetermined level in the trough 104 to admit air to the reservoir 107 forcing adhesive therefrom and into the trough 104. When the adhesive reaches a desired level in the trough 104, the switch 113 closes the valve 111 to stop the flow of adhesive. In operation of the apparatus, the discs 102 are driven in the direction indicated by the arrow in Fig. 3.

Preferably, means is provided to wipe excess adhesive from the surface of the tongues 30 as the same are raised from their lower to their upper position. In the illustrated embodiment of the invention, the wiper means comprises a plurality of flat, horizontally disposed triangular shaped members 110 mounted to extend into the interstices between the fingers 30 and above the discs 102 as indicated in Figs. 2 and 3. The members 110 may be formed of any suitable rigid material and are secured to a mounting member 112 extending transversely of the machine and fitting at its opposite ends in guides 114 (see Fig. 10) mounted one on each of the side plates 43, 44 so that the wiping fingers 110 may be moved horizontally into engagement with the surfaces of the fingers 30 and out of engagement therewith. To effect reciprocation of the members 110, suitable means may be provided such as a fluid motor, best shown in Figs. 1 and 3, including a cylinder 120 fixed to the frame of the machine and a piston 122 connected to one end of a crank 124 secured to the center of a transverse shaft 125 journaled in brackets 126. Secured to the ends of the shaft 125 are links 127 which in turn are secured by pins 129 to push rods 128 suitably fastened to the cross member 112. As indicated in Fig. 3, operation of the motor 121, 122 effects reciprocation of the wiper fingers 110 and supporting mechanism between the position shown in dotted lines and that shown in solid lines.

Figure 12:
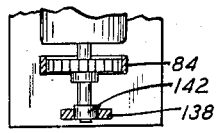
Fig. 12 is a sectional view taken along line 12—12 of Fig. 1.

Means are provided to vibrate the adhesive applying fingers 30 to assure contact of the same with the fingers of the board 10. Referring more particularly to Figs. 1, 2 and 12, secured to the side plate 43 by bolts 136 or other means is a vertically extending rigid bar 138 having a rectangular opening or cam slot 140 formed therein with the larger dimension of the opening extending vertically. Secured eccentrically to the shaft of the motor 85 is a circular cam 142 having a diameter substantially equal to the width of the cam slot 140 and being mounted therein. As will be apparent, as the cam 142 revolves the bar 138 will be shifted from side to side causing the entire assembly supported on the standard 46 to shift correspondingly, the channel member 45 revolving on the plate 47 and upon which a lubricant may, of course, be placed.

To receive boards after adhesive has been applied thereto a table 130 having supporting rollers 132 may be positioned in the side of the apparatus opposite the table 20.

Operation

The operation of the apparatus of the invention will be clear from the foregoing description thereof, but by way of summary, it may be stated that a board to which adhesive is to be applied is placed upon the table 20 in the position indicated in Fig. 3. The motor 60, 62 is then actuated to effect raising of the glue applying fingers 30. As the fingers 30 are raised, the motor 120, 122 is actuated to cause the wiping fingers 110 to move into engagement with the surface of the fingers 30 so that during the upward movement of the fingers 30, excess adhesive will be wiped from the surface thereof. When the fingers 30 are elevated, the board 10 is moved longitudinally to thrust the fingers 12 thereof between the fingers 30. As the board 10 is brought into engagement with the fingers 30, the latter will vibrate horizontally and the finger ribs 34 will be flexed to express adhesive from the grooves between the ribs and onto the adjacent board surfaces 16 to form an adhesive layer 18 on the fingers as indicated in Fig. 11. The board 10 is then retracted slightly to avoid scraping adhesive onto the upper surface thereof as the fingers 30 are reversed, the wiping fingers 110 are retracted and the motors 60, 62 actuated to lower the glue applying fingers 30 whereafter the board 10 may be rolled on the rollers 22 onto the receiving table 130. Upon lowering of the fingers 30, a fresh supply of adhesive will be sprayed thereupon from the discs 102. As will be apparent, a board 10 is automatically aligned with the fingers 30 as the board is moved into contact therewith. It will also be apparent that various width boards may be treated without adjustment of the machine.

Obviously, control can be either manual or may be effected by automatic means synchronized with the mechanism for feeding the boards 10 into and out of the glue applying apparatus. Such control means will be obvious to those skilled in the art and have not been illustrated herein.

Having illustrated and described the preferred embodiment of the invention, it should be understood that the invention permits of modification in detail and arrangement. We claim all such modifications that come within the true spirit and scope of the appended claims.

We claim:

1. Apparatus for applying adhesive to the joining surfaces of a finger joint board end, said joint comprising a plurality of alternate fingers and finger receiving slots of triangular outline, said surfaces being normal to the faces of the board, said apparatus comprising means for supporting a board to which adhesive is to be applied with said joint surfaces thereof extending vertically, a plurality of triangular adhesive applying fingers shaped cooperatively to engage between said board fingers and having opposite vertical adhesive applying surfaces, said fingers comprising a resilient material formed with vertically extending ribs on the adhesive applying surfaces thereof, means supporting said fingers for vertical movement between a first position opposite the position of a board to be treated and a second position beneath the plane of such a board, means for applying adhesive to said adhesive applying fingers comprising a plurality of discs having a periphery triangular in cross section, means mounting said discs so as to extend partially between said fingers in said second position thereof, means for rotatably supporting and driving said discs, an adhesive reservoir trough supported beneath said discs in such position that the discs will rotate through adhesive retained in said trough, wiper means mounted above said discs but below the position of said board for engaging said finger adhesive applying surfaces to wipe excess adhesive thereoff as said fingers are moved from said second position to said first position, and means for moving said wiper means between a first position in engagement with said fingers and a second position out of engagement therewith.

2. Apparatus for applying adhesive to the joining surfaces of a finger joint board end, said joint comprising a plurality of alternate fingers and finger receiving slots of triangular outline, said surfaces being normal to the faces of the board, said apparatus comprising means for supporting a board to which adhesive is to be applied with said joint surfaces thereof extending vertically, a plurality of triangular adhesive applying fingers shaped cooperatively to engage between said board fingers and having opposite vertical adhesive applying surfaces, means supporting said fingers for vertical movement between a first position opposite the position of a board to be treated and a second horizontal position beneath the plane of such a board, means for applying adhesive to said adhesive applying fingers comprising a plurality of discs having a periphery in triangular cross section for engaging between said adhesive applying fingers, means mounting said discs so as to engage between said fingers in said second position thereof, an adhesive reservoir trough supported beneath said discs in such position that the discs will rotate through adhesive retained in said trough, and wiper means mounted above said disc but below the position of said board for engaging the glue applying surfaces of said fingers to wipe excess adhesive thereoff as said fingers are moved from said second position to said first position.

3. Apparatus for applying adhesive to the joining surfaces of a finger joint board end having a plurality of alternate fingers and finger receiving slots defined by surfaces normal to the opposite faces of the board, said apparatus comprising means for supporting a board to which adhesive is to be applied, a plurality of adhesive applying fingers shaped cooperatively to engage between said board fingers, means for bringing said adhesive applying and said board fingers into engagement, and means for vibrating said adhesive applying fingers in a direction parallel to the plane of said board faces.

4. Apparatus for applying adhesive to the joining surfaces of a finger joint board end having a plurality of alternate fingers and finger receiving slots defined by surfaces normal to the opposite faces of the board, said apparatus comprising means for supporting a board to which adhesive is to be applied with said surfaces extending vertically, a plurality of triangular adhesive applying fingers shaped cooperatively to engage between said board fingers, means for bringing said adhesive applying and said board fingers into engagement, and means for vibrating said adhesive applying fingers horizontally.

References Cited in the file of this patent

FOREIGN PATENTS 130,136    Sweden _____ Nov. 21, 1950